(12) United States Patent
Terada et al.

(10) Patent No.: US 11,794,845 B2
(45) Date of Patent: Oct. 24, 2023

(54) LEANING VEHICLE WITH A LEFT-RIGHT PAIR OF WHEELS

(71) Applicant: YAMAHA HATSUDOKI KABUSHIKI KAISHA, Iwata (JP)

(72) Inventors: Keisuke Terada, Shizuoka (JP); Toshifumi Uchiyama, Shizuoka (JP); Keizo Araki, Aichi (JP); Shota Kubo, Aichi (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 145 days.

(21) Appl. No.: 17/359,003

(22) Filed: Jun. 25, 2021

(65) Prior Publication Data

US 2021/0316809 A1 Oct. 14, 2021

Related U.S. Application Data

(63) Continuation-in-part of application No. PCT/JP2019/051353, filed on Dec. 27, 2019.

(30) Foreign Application Priority Data

Dec. 27, 2018 (JP) .................................. 2018-244901

(51) Int. Cl.
*B62K 5/10* (2013.01)
*B62D 9/02* (2006.01)
(Continued)

(52) U.S. Cl.
CPC .................. *B62K 5/10* (2013.01); *B62D 9/02* (2013.01); *B62D 61/065* (2013.01); *B62D 61/08* (2013.01)

(58) Field of Classification Search
CPC . B62K 5/10; B62K 5/027; B62K 5/05; B62K 5/08; B62K 21/00; B62D 9/02;
(Continued)

(56) References Cited

U.S. PATENT DOCUMENTS 11,014,600 B2* 5/2021 Hara ........................ B62K 5/08
2007/0193803 A1 8/2007 Geiser
(Continued)

FOREIGN PATENT DOCUMENTS

JP 2006218937 A 8/2006
JP 2011131620 A 7/2011
(Continued)

*Primary Examiner* — Paul N Dickson
*Assistant Examiner* — Shams Dhanani
(74) *Attorney, Agent, or Firm* — Rabin & Berdo, P.C.

(57) ABSTRACT

A leaning vehicle, including a vehicle body, one steerable front wheel and two rear wheels, or two steerable front wheels and one or two rear wheels, a suspension mechanism, a steering mechanism, a steering controller, and an up-down direction acceleration detector attached to the vehicle body or the suspension mechanism. The two steerable front wheels or the two rear wheels are arranged side by side to form a left-right pair of wheels. The up-down direction acceleration detector detects an acceleration in an up-down direction of the leaning vehicle or the vehicle body, generated as one wheel in the left-right pair of wheels passes a bump or a pothole in a road. The steering controller so controls the one or two steerable front wheels that the one or two steerable front wheels are in a free-steering state, so as to swivel around a steering axis freely, based on the detected acceleration.

9 Claims, 9 Drawing Sheets

(51) Int. Cl.
*B62D 61/06* (2006.01)
*B62D 61/08* (2006.01)

(58) Field of Classification Search
CPC ........ B62D 61/065; B62D 61/08; B62J 45/40; B62J 45/412; B62J 45/414
See application file for complete search history.

(56) References Cited

U.S. PATENT DOCUMENTS

2018/0237065 A1\* 8/2018 Yamamoto ........... B60G 21/007
2018/0265158 A1\* 9/2018 Hara ........................ B62K 5/05
2018/0362109 A1\* 12/2018 Vidolov ................. B62K 5/027

FOREIGN PATENT DOCUMENTS

| JP | 2012020739 A | \* | 2/2012 | ............... B62K 3/00 |
| JP | 2012020739 A | | 2/2012 | |
| JP | 2017177905 A | \* | 10/2017 | |
| JP | 2017177905 A | | 10/2017 | |

\* cited by examiner

LEANING VEHICLE WITH A LEFT-RIGHT PAIR OF WHEELS

CROSS-REFERENCE TO RELATED APPLICATIONS

This is a continuation-in-part application of International Application PCT/JP2019/051353 filed on Dec. 27, 2019, which claims priority from a Japanese Patent Application No. 2018-244901, filed on Dec. 27, 2018. The contents of the applications are incorporated herein by reference.

TECHNICAL FIELD

The present teaching relates to a leaning vehicle with a left-right pair of wheels.

BACKGROUND ART

Leaning vehicles already exist and are on the market. A leaning vehicle includes a plurality of wheels, and a leaning vehicle body. The plurality of wheels includes at least one front wheel and at least one rear wheel. The steerable wheel of the leaning vehicle is, for example, the front wheel. The steerable wheel is supported by the leaning vehicle body in such a manner so as to be able to swivel around an axis extending in a leaning vehicle body's up-down direction. The leaning vehicle body leans leftward when the leaning vehicle is turning left and leans rightward when the leaning vehicle is turning right.

The plurality of wheels may include a left-right pair of wheels that are arranged side by side in a left-right direction of the leaning vehicle. The left-right pair of wheels may be a pair of front wheels or a pair of rear wheels.

The leaning vehicle body of such a leaning vehicle with a left-right pair of wheels may lean to the left or right of the leaning vehicle momentarily due to a disturbance during motion. Also, there is a case in which only the left or right wheel of the left-right pair of wheels passes over, for example, a bump or pothole in the road, the leaning vehicle body momentarily leans to the left or right of the leaning vehicle.

A leaning vehicle disclosed in Japanese Patent Application Publication No. 2017-177905 sets the steerable wheel to a free-steering state, so able to swivel around a steering axis freely when a disturbance that will cause the leaning vehicle body to lean to the left or right of the leaning vehicle momentarily is detected.

The leaning vehicle disclosed in the publication above detects an occurrence of a disturbance in any manner of (1), (2) or (3) below. Specifically, (1) When the difference between an actual roll angle that is a roll angle actually detected by a gyroscope sensor and a target roll angle that is a roll angle inputted by the rider is greater than a threshold, an occurrence of a disturbance is detected. (2) When a roll rate actually detected by the gyroscope sensor is greater than a threshold, an occurrence of a disturbance is detected. (3) When it is estimated based on an image captured by a vehicle-mounted camera that only the left or right wheel of a pair of wheels is to pass over a bump or pothole in the road, an occurrence of a disturbance is detected.

CITATION LIST

Patent Literature

Patent Literature 1: Japanese Patent Application Publication No. 2017-177905

SUMMARY OF INVENTION

Technical Problem

In the case of (1) or (2) above, an actual roll angle or roll rate detected by a gyroscope sensor is used in the detection of an occurrence of a disturbance. However, both the actual roll angle and the roll rate can be obtained also when the gyroscope sensor detects leaning of the leaning vehicle body due to an operation inputted by the rider. Accordingly, it may be difficult to clearly distinguish whether the actual roll angle or roll rate detected by the gyroscope sensor is due to an operation inputted by the rider or due to a disturbance. Therefore, in the case of (1) or (2), complex processes may be necessary to detect an occurrence of a disturbance and distinguish whether the leaning of the leaning vehicle body is due to a disturbance or an operation inputted by the rider.

In the case of (3) above, the course of the movement of the vehicle is estimated based on an image captured by a vehicle-mounted camera. The course of the movement of the vehicle is estimated based on, for example, a vehicle speed detected by a vehicle speed sensor and a yaw rate detected by a yaw rate sensor. Therefore, complex calculation may be necessary to estimate that only the left or right wheel of a left-right pair of wheels will pass over a bump or pothole in the road. Thus, in the case of (3) also, complex processes may be necessary to detect an occurrence of a disturbance.

An objective of the present teaching is to provide a leaning vehicle with a left-right pair of wheels that easily detects an occurrence of a disturbance that will cause the leaning vehicle body to lean to the left or right of the leaning vehicle momentarily, for example, when only the left or right wheel of the pair of wheels passes over a bump or pothole in the road.

Solution to Problem

A leaning vehicle with a left-right pair of wheels according to an embodiment of the present teaching includes: a leaning vehicle body that leans in a vehicle's leftward direction when the leaning vehicle is turning left and leans in a vehicle's rightward direction when the leaning vehicle is turning right; and a plurality of wheels including a left-right pair of wheels that are arranged side by side in a vehicle's left-right direction, the plurality of wheels including one or two steerable front wheels that are supported by the leaning vehicle body in such a manner so as to be able to swivel around a steering axis extending in a vehicle body's up-down direction, and one or two rear wheels that are supported by the leaning vehicle body, the number of the rear wheels being two when the number of the steerable front wheels is one, the number of the rear wheels being one or two when the number of the steerable front wheels is two, and the left-right pair of wheels being two steerable front wheels that are arranged side by side in the vehicle's left-right direction or being two rear wheels that are arranged side by side in the vehicle's left-right direction.

The leaning vehicle with a left-right pair of wheels further includes a suspension mechanism that supports the left-right pair of wheels in such a manner that the left-right pair of wheels is movable in the vehicle body's up-down direction relative to the leaning vehicle body; a steering mechanism that applies torque to the one or two steerable front wheels to swivel the one or two steerable front wheels around the steering axis; and a steering controller that controls the steering mechanism.

The leaning vehicle body of the leaning vehicle with a left-right pair of wheels leans to the left or right of the leaning vehicle due to a turn operation inputted by the rider. Apart from such cases, the leaning vehicle body of the leaning vehicle with a left-right pair of wheels sometimes leans to the left or right of the leaning vehicle momentarily. This momentary leaning is caused, for example, as one of the left-right pair of wheels passes over a bump or pothole in the road. It is preferred that such momentary leaning of the leaning vehicle body to the left or right of the leaning vehicle caused by a disturbance is distinguished from the leaning of the leaning vehicle body due to a turn operation inputted by the rider.

Therefore, the present inventors conducted a detailed study of a disturbance that will cause the leaning vehicle body to lean to the left or right of the leaning vehicle, for example, when one of the left-right pair of wheels passes over a bump or pothole in the road, in order to find out how to distinguish whether the leaning of the leaning vehicle body is due to a disturbance or due to a turn operation inputted by the rider. As a result, the present inventors found that when a disturbance, which causes momentary leaning of the leaning vehicle body to the left or right of the leaning vehicle, occurs, for example, when one of the left-right pair of wheels passes over a bump or pothole in the road, the acceleration in a vehicle's up-down direction or a vehicle body's up-down direction greatly changes as compared with a case in which the leaning vehicle body of the leaning vehicle leans to the left or right of the leaning vehicle due to a turn operation inputted by the rider. Thus, the present inventors found that it is possible to detect, based on the acceleration in the vehicle's up-down direction or the vehicle body's up-down direction, an occurrence of a disturbance that will cause momentary leaning of the leaning vehicle body to the left or right of the leaning vehicle, for example, when one of the left-right pair of wheels passes over a bump or pothole in the road.

Therefore, the leaning vehicle with a left-right pair of wheels according to the embodiment of the present teaching includes an up-down direction acceleration detector that detects the acceleration in the vehicle's up-down direction or the vehicle body's up-down direction, and the up-down direction acceleration detector is attached to the leaning vehicle body or the suspension mechanism to detect an acceleration in the vehicle's up-down direction or the vehicle body's up-down direction generated as one of the left-right pair of wheels passes over a bump or pothole in the road. The steering controller controls the one or two steerable front wheels in such a manner that the one or two steerable front wheels are in a free-steering state, so able to swivel around the steering axis freely, based on the acceleration generated in the vehicle's up-down direction or the vehicle body's up-down direction and detected by the up-down direction acceleration detector, as one of the left-right pair of wheels passes over a bump or pothole in the road.

The leaning vehicle with a left-right pair of wheels according to the embodiment of the present teaching can detect an acceleration in the vehicle's up-down direction or the vehicle body's up-down direction generated as one of the left-right pair of wheels passes over a bump or pothole in the road. Therefore, momentary leaning of the leaning vehicle body to the left or right of the leaning vehicle due to a disturbance, for example, when one of the left-right pair of wheels passes over a bump or pothole in the road, can be distinguished from leaning of the leaning vehicle body to the left or right of the leaning vehicle due to an operation inputted by the rider of the leaning vehicle. Thus, the leaning vehicle with a left-right pair of wheels, according to the embodiment of the present teaching, can easily detect an occurrence of a disturbance that will cause momentary leaning of the leaning vehicle body to the left or right of the leaning vehicle, for example, when one of the pair of left and right front wheels passes over a bump or pothole in the road.

When the leaning vehicle with a left-right pair of wheels, according to the embodiment of the present teaching, detects an occurrence of a disturbance that will cause the leaning vehicle body to lean in the vehicle's leftward direction or the vehicle's rightward direction momentarily, for example, as one of the left-right pair of wheels passes over a bump or pothole in the road, the leaning vehicle controls the one or two steerable front wheels to a free-steering state, so able to swivel around the steering axis freely, depending on the extent of the acceleration detected as the disturbance.

As long as the leaning vehicle body of the leaning vehicle with a left-right pair of wheels leans in a vehicle's leftward direction, which is a direction to the left of the leaning vehicle, when the leaning vehicle is turning left, and leans to a vehicle's rightward direction, which is a direction to the right of the leaning vehicle, when the leaning vehicle is turning right, the leaning vehicle body is not particularly limited. The leaning vehicle body includes a vehicle body frame. The vehicle body frame may be a frame made by assembly of a plurality of parts or a frame made by integral forming. The material of the vehicle body frame may be a metal such as aluminum, iron or the like, a synthetic resin such as CFRP or the like, or a combination of a metal and a resin. The vehicle body frame may be a monocoque type that is formed of exterior parts of the leaning vehicle, or may be a semi-monocoque type, part of which also functions as an exterior part of the leaning vehicle.

In the leaning vehicle with a left-right pair of wheels according to the embodiment of the present teaching, the one or two steerable front wheels are not particularly limited, as long as the one or two steerable front wheels are supported by the leaning vehicle body in such a manner so as to be able to swivel around the steering axis extending in the vehicle body's up-down direction. The steering axis extending in the vehicle body's up-down direction does not need to extend in the vertical direction when the leaning vehicle body is in an upright state. The steering axis extending in the vehicle body's up-down direction may be inclined from the vertical direction toward the back of the leaning vehicle body when the leaning vehicle body is in an upright state. The way in which the one or two steerable front wheels are supported by the leaning vehicle body is not particularly limited. For example, the one or two steerable front wheels may be supported by the leaning vehicle body directly or may be supported by the vehicle body indirectly. The ways in which the one or two steerable front wheels are supported by the vehicle body indirectly include, for example, a case of using a suspension mechanism that is positioned between the one or two steerable front wheels and the leaning vehicle body and supports the one or two steerable front wheels relative to the leaning vehicle body. A suspension mechanism that supports one steerable front wheel relative to the leaning vehicle body is, for example, a telescopic type or bottom link type front fork. A suspension mechanism that supports two steerable front wheels relative to the leaning vehicle body is, for example, an independent suspension.

In the leaning vehicle with a left-right pair of wheels according to the embodiment of the present teaching, the way in which the one or two rear wheels are supported by the leaning vehicle body is not particularly limited. The one or two rear wheels, for example, may be supported by the leaning vehicle body directly or may be supported by the leaning vehicle body indirectly. The ways in which the one or two rear wheels are supported by the leaning vehicle body indirectly include, for example, a case of using a suspension mechanism that is positioned between the one or two rear wheels and the leaning vehicle body and supports the one or two rear wheels relative to the vehicle body. A suspension mechanism that supports one rear wheel relative to the leaning vehicle body is, for example, a swingarm suspension. A suspension mechanism that supports two rear wheels relative to the leaning vehicle body is, for example, an independent suspension.

In the leaning vehicle with a left-right pair of wheels according to the embodiment of the present teaching, the suspension mechanism is not particularly limited, as long as the suspension mechanism supports the left-right pair of wheels in such a manner that the left-right pair of wheels are movable in the vehicle body's up-down direction relative to the leaning vehicle body. Such a suspension mechanism is, for example, an independent suspension.

In the leaning vehicle with a left-right pair of wheels according to the embodiment of the present teaching, the steering mechanism is not particularly limited, as long as the steering mechanism applies torque to the one or two steerable front wheels. For example, the steering mechanism includes a torque transmission mechanism. The torque transmission mechanism includes, for example, a steering actuator that is driven in accordance with a turn operation inputted by the rider. The torque transmission mechanism, for example, may include a clutch that permits and blocks the torque transmission from the steering actuator to the one or two steerable front wheels. The torque to be applied to the one or two steerable front wheels is outputted from the steering actuator that is driven in accordance with a turn operation inputted by the rider.

In the leaning vehicle with a left-right pair of wheels according to the embodiment of the present teaching, the steering controller is not particularly limited, as long as the steering controller controls the steering mechanism. The steering controller is only required to carry out control in such a manner that the one or two steerable front wheels are in a free-steering state, so able to swivel around the steering axis freely, based on the acceleration in the vehicle's up-down direction or the vehicle body's up-down direction detected by the up-down direction acceleration detector as an acceleration in the vehicle's up-down direction or the vehicle body's up-down direction generated as one of the left-right pair of wheels passes over a bump or pothole in the road. The one or two steerable front wheels becoming a free-steering state, so able to swivel around the steering axis freely means, for example, a state in which the one or two steerable front wheels are able to swivel around the steering axis freely regardless of the turn operation inputted by the rider of the leaning vehicle with a left-right pair of wheels. The way in which the steering controller sets the one or two steerable front wheels to a free-steering state, so able to swivel around the steering axis freely is, for example, carrying out zero-torque control of the steering actuator, supplying zero electric current to the steering actuator, or using a clutch that permits and blocks the torque transmission from the steering actuator of the steering mechanism to the one or two steerable front wheels. The zero-torque control includes controlling the current supplied to the steering actuator in such a manner that the resistance of an output member of the steering actuator against rotation due to an external force (rotational resistance) come close to zero.

In the leaning vehicle with a left-right pair of wheels according to the embodiment of the present teaching, the up-down direction acceleration detector is not particularly limited, as long as the up-down direction acceleration detector is attached to the leaning vehicle body or the suspension mechanism to detect an acceleration in the vehicle's up-down direction or the vehicle body's up-down direction and can detect an acceleration in the vehicle's up-down direction or the vehicle body's up-down direction generated as one of the left-right pair of wheels passes over a bump or pothole in the road. The up-down direction acceleration detector does not necessarily detect the acceleration itself in the vehicle's up-down direction or the vehicle body's up-down direction. The up-down direction acceleration detector may detect a physical quantity relating to the acceleration in the vehicle's up-down direction or the vehicle body's up-down direction. The physical quantity relating to the acceleration in the vehicle's up-down direction or the vehicle body's up-down direction is not particularly limited, as long as it poses information that contributes to the detection of acceleration in the vehicle's up-down direction or the vehicle body's up-down direction. The up-down direction acceleration detector may be, for example, a capacitance type, a piezoresistive type or a piezoelectric type. When the up-down direction acceleration detector is a piezoelectric type, the physical quantity relating to the acceleration in the vehicle's up-down direction or the vehicle body's up-down direction is a voltage generated by application of pressure on a piezoelectric member. The up-down direction acceleration detector may be implemented, for example, by an inertial measurement unit (IMU). For example, the up-down direction acceleration detector may detect a displacement in the vehicle's up-down direction or the vehicle body's up-down direction when the leaning vehicle passes over a bump or pothole in the road and the time required for the displacement, and may determine the acceleration in the vehicle's up-down direction or the vehicle body's up-down direction by using the displacement and the time. The acceleration to be detected by the up-down acceleration detector may be changed, for example, depending on where the up-down acceleration detector is attached. When the up-down direction acceleration detector is attached to the leaning vehicle body, the up-down acceleration detector, for example, should detect the acceleration in the vehicle body's up-down direction. When the up-down direction acceleration detector is attached to a member of the suspension mechanism that does not swing or lean together with the leaning vehicle body, the up-down direction acceleration detector, for example, should detect the acceleration in the vehicle's up-down direction. When the up-down direction acceleration detector is attached to a member of the suspension mechanism that swings or leans together with the leaning vehicle body, the up-down direction acceleration detector, for example, should detect the acceleration in the vehicle body's up-down direction. The up-down direction acceleration detector may detect the acceleration in the vehicle's up-down direction or the vehicle body's up-down direction above the spring or below the spring. The bump or pothole may be a rise projecting from the road surface or a hole sinking from the road surface. Thus, the bump or pothole in the road means something that cases a leaning vehicle passing thereover to have an acceleration in the vehicle's up-down direction or the vehicle body's up-down direction.

While the leaning vehicle with a left-right pair of wheels according to the embodiment of the present teaching is traveling into a turn, the steering controller of the leaning vehicle with a left-right pair of wheels may control the one or two steerable front wheels in such a manner that the one or two steerable front wheels are in a free-steering state, so able to swivel around the steering axis freely, based on the acceleration in the vehicle's up-down direction or the vehicle body's up-down direction detected by the up-down direction acceleration detector as an acceleration in the vehicle's up-down direction or the vehicle body's up-down direction generated as one of the left-right pair of wheels passes over a bump or pothole in the road.

In this case, when one of the left-right pair of wheels of the leaning vehicle passes over a bump or pothole in the road while the leaning vehicle is traveling into a turn, the one or two steerable front wheels can be set to a free-steering state, so able to swivel around the steering axis freely. Accordingly, in this case, even while the leaning vehicle body is leaning, when one of the left-right pair of wheels passes over a bump or pothole in the road, the one or two steerable front wheels can be set to a free-steering state, so able to swivel around the steering axis freely.

The leaning vehicle with a left-right pair of wheels according to the embodiment of the present teaching may further include a vehicle speed detector. The vehicle speed detector detects the speed of the leaning vehicle with a left-right pair of wheels and sends the detected speed of the leaning vehicle with a left-right pair of wheels to the steering controller.

In the case in which the leaning vehicle includes such a vehicle speed detector, the steering controller may control the one or two steerable front wheels in such a manner that the one or two steerable front wheels are in a free-steering state, so able to swivel around the steering axis freely, based on the acceleration in the vehicle's up-down direction or the vehicle body's up-down direction detected by the up-down direction acceleration detector and the speed of the leaning vehicle with a left-right pair of wheels detected by the vehicle speed detector.

In this case, for example, when the leaning vehicle is traveling in a predetermined speed range, the one or two steerable front wheels can be set to a free-steering state, so able to swivel around the steering axis freely.

The leaning vehicle with a left-right pair of wheels according to the embodiment of the present teaching, the suspension mechanism may include a swingable member. The swingable member swings in the vehicle body's up-down direction when the left-right pair of wheels move in the vehicle body's up-down direction relative to the leaning vehicle body.

The leaning vehicle in which the suspension mechanism includes such a swingable member may further comprise a swing angle detector. The swing angle detector detects a swing angle of the swingable member and sends the detected swing angle of the swingable member to the steering controller.

In the case in which the leaning vehicle includes such a swing angle detector, the steering controller may control the one or two steerable front wheels in such a manner that the one or two steerable front wheels are in a free-steering state, so able to swivel around the steering axis freely, based on the acceleration in the vehicle's up-down direction or the vehicle body's up-down direction detected by the up-down direction acceleration detector and the swing angle of the swingable member detected by the swing angle detector.

In this case, the acceleration in the vehicle's up-down direction or the vehicle body's up-down direction detected by the up-down direction acceleration detector and the swing angle of the swingable member detected by the swing angle detector are used, and therefore, the controller can grasp the situation more appropriately for more appropriate control as to whether to set the one or two steerable front wheels to a free-steering state, so able to swivel around the steering axis freely.

In the leaning vehicle with a left-right pair of wheels according to the embodiment of the present teaching, the steering mechanism may include a steering actuator. The steering actuator applies torque to the one or two steerable front wheels to swivel the one or two steerable front wheels around the steering axis.

In this case, the steering controller may control the one or two steerable front wheels in such a manner that the one or two steerable front wheels are in a free-steering state, so able to swivel around the steering axis freely by means of (1), (2) or (3) below:

(1) carrying out zero-torque control of the steering actuator;
(2) supplying zero electric current to the steering actuator; or
(3) providing a clutch that permits and blocks the torque transmission from the steering actuator to the one or two steerable front wheels, and blocking the torque transmission from the steering actuator to the one or two steerable front wheels by the clutch.

Some embodiments of the present teaching will hereinafter be described in detail with reference to the drawings, and the detailed description of the embodiments will provide a clearer picture of the above-mentioned object and other objects, the features, the aspects and the advantages of the present teaching.

The term "and/or" used herein includes one of the associated items in a list and all possible combinations of the associated items.

The terms "including", "comprising", or "having", and variations thereof used herein specify the presence of stated features, steps, operations, elements, components, and/or equivalents thereof, and can include one or more of steps, operations, elements, components, and/or their groups.

Unless otherwise defined, all terms (including technical and scientific terms) used herein have the same meanings as commonly understood by one of ordinary skill in the art to which the present teaching pertains.

It should be understood that terms, such as those defined in commonly used dictionaries, should be interpreted as having meanings that are consistent with their meanings in the context of the present disclosure and relevant art and should not be interpreted in an idealized or overly formal sense unless expressly so defined herein.

It should be understood that the description of the present teaching discloses a number of techniques and steps. Each of these has individual benefit, and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

In the description given below, for the purpose of explanation, numerous specific details are set forth in order to provide a complete understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

Advantageous Effect of Invention

The present teaching facilitates the detection of an occurrence of a disturbance that will cause a leaning vehicle body of a leaning vehicle to lean to the left or right of the leaning vehicle momentarily, for example, when only one of the left-right pair of wheels passes over a bump or pothole in the road.

DESCRIPTION OF EMBODIMENTS

With reference to the drawings, a leaning vehicle according to an embodiment of the present teaching will hereinafter be described in detail. The embodiment described below is merely an example. The present teaching should not be interpreted as being limited to the embodiment below.

Figure 1:
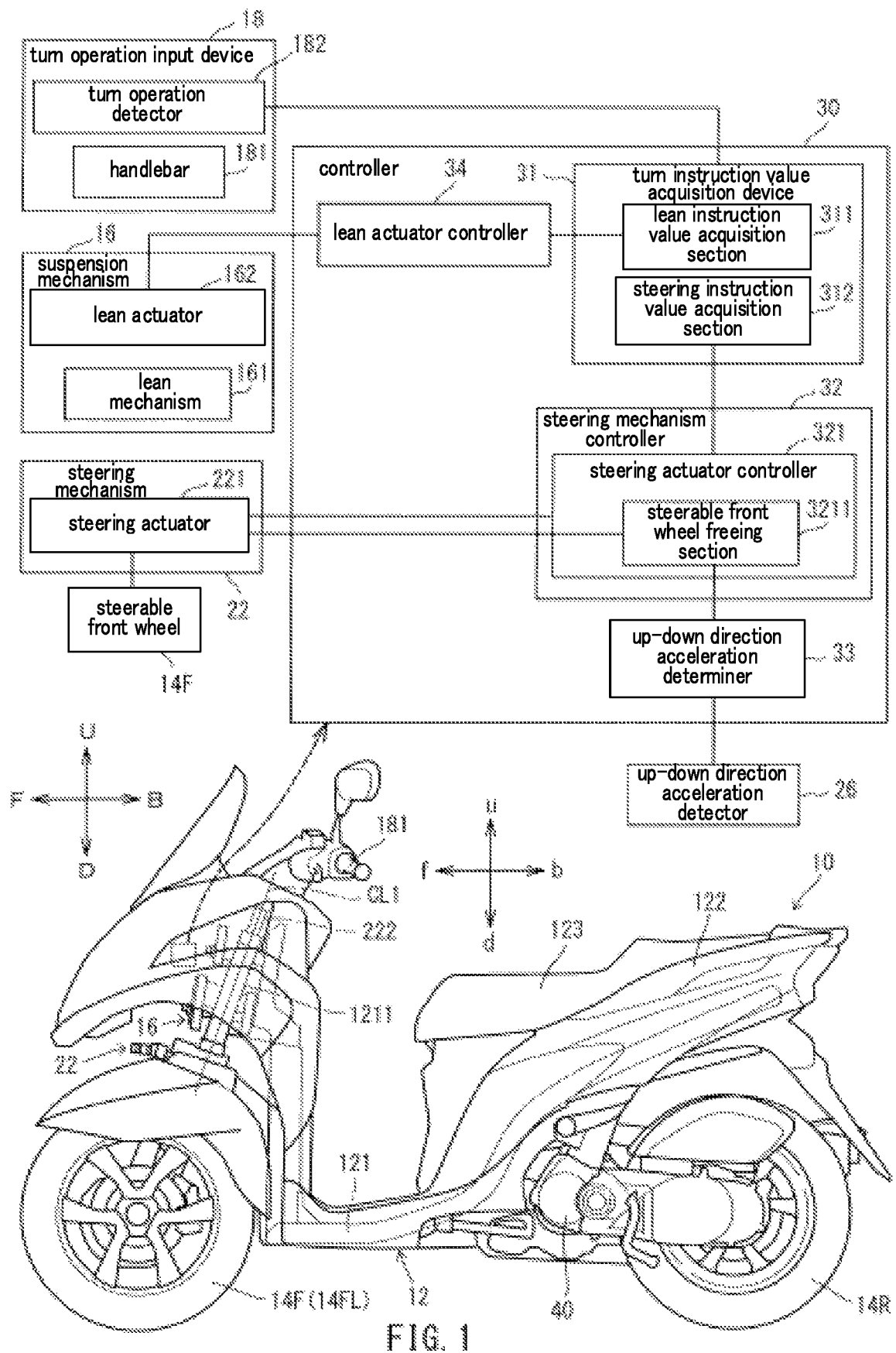
FIG. 1 is a diagram showing a left side view of a leaning vehicle according to an embodiment of the present teaching along with a block diagram of a controller contained in the leaning vehicle.

With reference to FIG. 1, a leaning vehicle 10 according to an embodiment of the present teaching will be described. FIG. 1 is a diagram showing a left side view of the leaning vehicle 10 and a block diagram of a controller 30 of the leaning vehicle 10.

In the present specification, directions relative to the leaning vehicle 10 are defined as follows.

A forward direction of the leaning vehicle 10 is defined as Vehicle's forward direction F. A backward direction of the leaning vehicle 10 is defined as Vehicle's backward direction B. A leftward direction of the leaning vehicle 10 is defined as Vehicle's leftward direction L. A rightward direction of the leaning vehicle 10 is defined as Vehicle's rightward direction R. An upward direction of the leaning vehicle 10 is defined as Vehicle's upward direction U. A downward direction of the leaning vehicle 10 is defined as Vehicle's downward direction D. The forward-backward direction of the leaning vehicle 10 is defined as Vehicle's front-back direction FB. The leftward-rightward direction of the leaning vehicle 10 is defined as Vehicle's left-right direction LR. The upward-downward direction of the leaning vehicle 10 is defined as Vehicle's up-down direction UD. The front-back, left-right and up-down directions are viewed as front-back, left-right, up-down from the perspective of a rider sitting on the seat 123 of the leaning vehicle 10.

The leaning vehicle body 12 of the leaning vehicle 10 is capable of leaning in Vehicle's leftward direction L or Vehicle's rightward direction R. When the leaning vehicle body 12 leans in Vehicle's leftward direction L or Vehicle's rightward direction R, the up-down direction and the left-right direction of the leaning vehicle body 12 do not respectively coincide with Up-Down Direction UD and Left-Right Direction LR of the leaning vehicle 10. On the other hand, when the leaning vehicle body 12 is in an upright posture, the up-down direction and the left-right direction of the leaning vehicle body 12 coincide with Up-Down Direction UD and Left-Right Direction LR of the leaning vehicle 10, respectively.

A forward direction of the leaning vehicle body 12 of the leaning vehicle 10 is defined as Vehicle body's forward direction f. A backward direction of the leaning vehicle body 12 is defined as Vehicle body's backward direction b. A leftward direction of the leaning vehicle body 12 is defined as Vehicle body's leftward direction l. A rightward direction of the leaning vehicle body 12 is defined as Vehicle body's rightward direction r. An upward direction of the leaning vehicle body 12 is defined as Vehicle body's upward direction u. A downward direction of the leaning vehicle body 12 is defined as Vehicle body's downward direction d. The forward-backward direction of the leaning vehicle body 12 is defined as Vehicle body's front-back direction fb. The leftward-rightward direction of the leaning vehicle body 12 is defined as Vehicle body's left-right direction lr. The upward-downward direction of the leaning vehicle body 12 is defined as Vehicle body's up-down direction ud.

As shown in FIG. 1, the leaning vehicle 10 includes a leaning vehicle body 12, a plurality of wheels 14, a suspension mechanism 16, a turn operation input device 18, a steering mechanism 22, an up-down direction acceleration detector 26, and a controller 30 functioning as a steering controller.

The leaning vehicle body 12 leans in Vehicle's leftward direction L when the leaning vehicle 10 is turning in Vehicle's leftward direction L, and leans in Vehicle's rightward direction R when the leaning vehicle 10 is turning in Vehicle's rightward direction R. The leaning vehicle body 12 supports the plurality of wheels 14.

The leaning vehicle body 12 includes a vehicle body frame 121, a vehicle body cover 122, and a seat 123. These will be described below.

The vehicle body frame 121 includes a head pipe 1211. The head pipe 1211 is positioned in the front end part of the vehicle body frame 121.

The leaning vehicle 10 further includes a power unit 40. The power unit 40 includes, for example, a drive source such as an engine, an electric motor or the like, a transmission, etc. The drive source may be a hybrid type, for example, having an engine and an electric motor. The power unit 40 is supported by the vehicle body frame 121.

The vehicle body cover 122 is attached to the vehicle body frame 121. The vehicle body cover 122 covers the vehicle body frame 121.

The seat 123 is supported by the vehicle body frame 121. The seat 123 is to be sat on by the rider of the leaning vehicle 10.

The plurality of wheels 14 includes two steerable front wheels 14F and one rear wheel 14R. These wheels will be described below.

The two steerable front wheels 14F are arranged side by side in Vehicle's left-right direction LR. Thus, the two steerable front wheels 14F are a left-right pair of wheels that are arranged side by side in Vehicle's left-right direction LR. The two steerable front wheels 14F include a steerable left front wheel 14FL and a steerable right front wheel 14FR. The two steerable front wheels 14F are supported by the head pipe 1211 of the leaning vehicle body 12 in such a manner so as to be able to swivel around a steering axis CL1 extending in Vehicle body's up-down direction ud. In the present embodiment, the steering axis CL1 coincides with the central axis of a steering shaft 222.

The one rear wheel 14R is supported by the leaning vehicle body 12. Specifically, the one rear wheel 14R is supported by the vehicle body frame 121 via a swing arm suspension.

Driving force from the power unit 40 is transmitted to the one rear wheel 14R, and thereby, the one rear wheel 14R rotates. As a result, the leaning vehicle 10 travels. Therefore, the drive wheel of the leaning vehicle 10 is the one rear wheel 14R.

The suspension mechanism 16 supports the two steerable front wheels 14F (i.e., the pair of right and left wheels) in such a manner that the two steerable front wheels 14F are movable in Vehicle body's up-down direction ud relative to the leaning vehicle body 12. The suspension mechanism 16 is positioned between the head pipe 1211 of the vehicle body frame 121 and the two steerable front wheels 14F. In other words, the head pipe 1211 of the vehicle body frame 121 is connected to the two steerable front wheels 14F via the suspension mechanism 16. The suspension mechanism 16 will be described in detail later.

The turn operation input device 18 receives a turn operation from the rider. The turn operation input device 18 includes a handlebar 181 as a manipulable member that can be manipulated by the rider. The handlebar 181 is to be manipulated by the rider to turn the leaning vehicle 10. In this way, the handlebar 181 receives a turn operation from the rider.

The turn operation input device 18 is configured to not transmit the turn operation inputted by the rider to the two steerable front wheels 14F mechanically, thereby preventing the two steerable front wheels 14F from swiveling around the steering axis CL1 due to mechanical transmission of the turn operation. Specifically, the handlebar 181 is not mechanically connected to the two steerable front wheels 14F.

The turn operation input device 18 further includes a turn operation detector 182. The turn operation detector 182 detects the direction and degree of a manipulation action applied to the handlebar 181. The turn operation detector 182 sends the detected direction and degree of the manipulation action applied to the handlebar 181 to the controller 30. As long as the turn operation detector 182 can detect the direction and degree of a manipulation action applied to the handlebar 181, the turn operation detector 182 is not particularly limited. The turn operation detector 182, for example, detects the direction and degree of a manipulation action applied to the handlebar 181 in a non-contact manner. The turn operation detector 182 is implemented, for example, by an encoder or the like.

Figure 2:
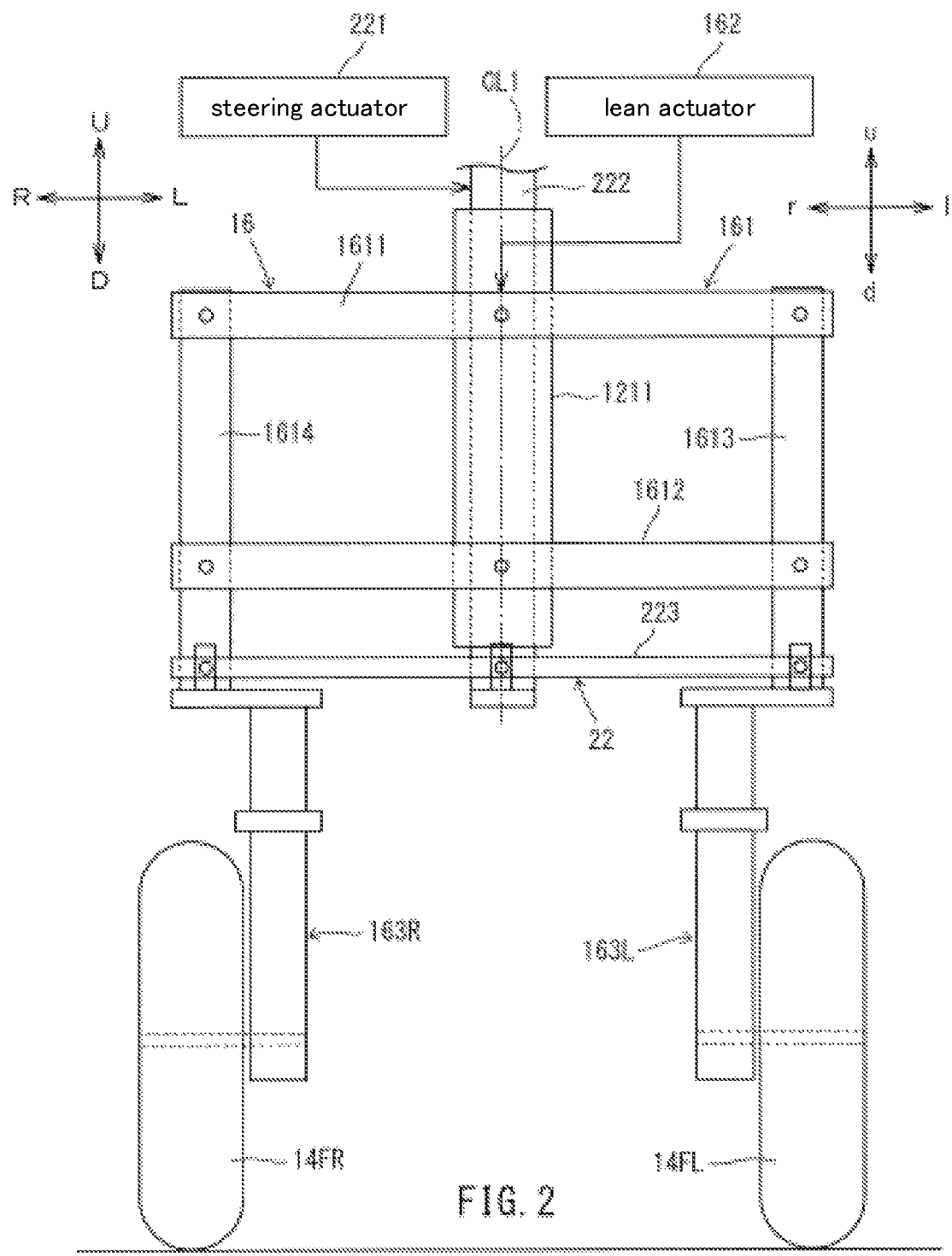
FIG. 2 is a diagram showing the basic structure of a suspension mechanism and a steering mechanism provided in the leaning vehicle according to the embodiment of the present teaching.

With reference to FIG. 2, the suspension mechanism 16 will be described. FIG. 2 is a schematic diagram showing the basic structure of the suspension mechanism 16 and the steering mechanism 22.

The suspension mechanism 16 includes a lean mechanism 161, a lean actuator 162, a left suspension 163L, and a right suspension 163R. These will be described below.

The lean mechanism 161 is a parallelogram link type lean mechanism. The lean mechanism 161 includes an upper arm 1611, a lower arm 1612, a left member 1613, and a right member 1614.

The upper arm 1611 and the lower arm 1612 are supported by the vehicle body frame 121 in such a manner that the upper and lower arms 1611 and 1612 are rotatable around a rotation axis extending in Vehicle body's front-back direction fb. In other words, the upper arm 1611 and the lower arm 1612, which are swingable members, are supported by the vehicle body frame 121 in such a manner so as to be swingable in Vehicle body's up-down direction ud. The upper arm 1611 and the lower arm 1612 are connected to the head pipe 1211 of the vehicle body frame 121 in such a manner so as to be separately rotatable around the head pipe 1211. In other words, the upper arm 1611 and the lower arm 1612, which are swingable members, are connected to the head pipe 1211 of the vehicle body frame 121 in such a manner so as to be separately swingable in Vehicle body's up-down direction ud.

The left member 1613 is supported by the left end part of the upper arm 1611 and the left end part of the lower arm 1612 in such a manner so as to be rotatable around a rotation axis extending in Vehicle body's front-back direction fb. Thus, the left member 1613 is rotatably connected to the left portion of the upper arm 1611 that is positioned to the left of the rotation axis (axis of rotation around the head pipe 1211) of the upper arm 1611 and to the left portion of the lower arm 1612 that is positioned to the left of the rotation axis (axis of rotation around the head pipe 1211) of the lower arm 1612. To the lower end part of the left member 1613, the left suspension 163L is connected via a bracket. The left suspension 163L is extendable and contractable in Vehicle body's up-down direction ud. The steerable left front wheel 14FL is rotatably connected to the left suspension 163L.

The right member 1614 is supported by the right end part of the upper arm 1611 and the right end part of the lower arm 1612 in such a manner so as to be rotatable around a rotation axis extending in Vehicle body's front-back direction fb. Thus, the right member 1614 is rotatably connected to the right portion of the upper arm 1611 that is positioned to the right of the rotation axis (axis of rotation around the head pipe 1211) of the upper arm 1611 and to the right portion of the lower arm 1612 that is positioned to the right of the rotation axis (axis of rotation around the head pipe 1211) of the lower arm 1612. The right suspension 163R is connected to the lower end part of the right member 1614 via a bracket. The right suspension 163R is extendable and contractable in Vehicle body's up-down direction ud. The steerable right front wheel 14FR is rotatably connected to the right suspension 163R.

As described above, to the left portion of the upper arm 1611 and the left portion of the lower arm 1612, which are positioned to the left of their respective rotation axes, the steerable left front wheel 14FL is rotatably connected via the left member 1613 and the left suspension 163L. Also, to the right portion of the upper arm 1611 and the right portion of the lower arm 1612, which are positioned to the right of their respective rotation axes, the steerable right front wheel 14FR is rotatably connected via the right member 1614 and the right suspension 163R. Accordingly, when the upper arm 1611 and the lower arm 1612 rotate around their respective rotation axes, the relative positions of the steerable left front wheel 14FL and the steerable right front wheel 14FR to the vehicle body frame 121 in Vehicle body's up-down direction ud change. When the relative positions of the steerable left front wheel 14FL and the steerable right front wheel 14FR to the vehicle body frame 121 in Vehicle body's up-down direction ud change, the vehicle body frame 121 leans in Vehicle's left-right direction LR. Thus, by controlling the rotation of the upper arm 1611 and the lower arm 1612 relative to the vehicle body frame 121, it is possible to control the lean of the vehicle body frame 121 in Vehicle's leftward direction L or Vehicle's rightward direction R (lean angle).

The lean actuator 162 causes the upper arm 1611 or the lower arm 1622 to rotate relative to the vehicle body frame 121 (more specifically, the head pipe 1211) in accordance with the turn operation inputted to the turn operation input device 18. The lean actuator 162 is, for example, an electric motor that can rotate an output member mechanically connected to the upper arm 1611 or the lower arm 1612 forward and in reverse. The output member is, for example, an output shaft connected to the rotor of the electric motor. In order to control the lean actuator 162, for example, position control to adjust the position of the output member of the lean actuator 162 is carried out.

When the output of the lean actuator 162 is transmitted to the upper arm 1611 or the lower arm 1612, the upper arm 1611 or the lower arm 1612 rotates relative to the vehicle body frame 121 (more specifically, the head pipe 1211). In other words, the upper arm 1611 or the lower arm 1612 swings relative to the vehicle body frame 121 (more specifically, the head pipe 1211). Then, the relative positions of the steerable left front wheel 14FL and the steerable right front wheel 14FR to the vehicle body frame 121 in Vehicle body's up-down direction ud change. As a result, the vehicle body frame 121 leans in Vehicle's leftward direction L or Vehicle's rightward direction R. Thus, the leaning vehicle body 12 leans in Vehicle's leftward direction L or Vehicle's rightward direction R.

Specifically, when the turn operation inputted to the turn operation input device 18 is an operation to turn the leaning vehicle 10 to Vehicle's leftward direction L, the lean actuator 162 causes the upper arm 1611 or the lower arm 1612 to rotate in one direction (which is referred to as a first direction) relative to the vehicle body frame 121 (more specifically the head pipe 1211). This changes the relative positions of the steerable left front wheel 14FL and the steerable right front wheel 14FR to the vehicle body frame 121 in Vehicle body's up-down direction ud, and the steerable left front wheel 14FL comes to a position higher than the steerable right front wheel 14FR in Vehicle body's up-down direction ud. Then, the vehicle body frame 121 and accordingly the leaning vehicle body 12 lean in Vehicle's leftward direction L.

Also, when the turn operation inputted to the turn operation input device 18 is an operation to turn the leaning vehicle 10 in Vehicle's rightward direction R, the lean actuator 162 causes the upper arm 1611 or the lower arm 1612 to rotate in another direction (which is an opposite direction to the first direction and referred to as a second direction) relative to the vehicle body frame 121 (more specifically, the head pipe 1211). This changes the relative positions of the steerable left front wheel 14FL and the steerable right front wheel 14FR to the vehicle body frame 121 in Vehicle body's up-down direction ud, and the steerable right front wheel 14FR comes to a position higher than the steerable left front wheel 14FL in Vehicle body's up-down direction ud. Then, the vehicle body frame 121 and accordingly the leaning vehicle body 12 lean in Vehicle's rightward direction R.

As is clear from the description above, the lean actuator 162 causes the two steerable front wheels 14F to lean in Vehicle's leftward direction L or Vehicle's rightward direction R together with the leaning vehicle body 12. Also, since the one rear wheel 14R is supported by the vehicle body frame 121, when the lean actuator 162 causes the two steerable front wheels 14F and the leaning vehicle body 12 to lean in Vehicle's leftward direction L or Vehicle's rightward direction R, the one rear wheel 14R leans in Vehicle's leftward direction L or Vehicle's rightward direction R together with the two steerable front wheels 14F and the leaning vehicle body 12. Thus, when the turn operation inputted to the turn operation input device 18 is an operation to turn the leaning vehicle 10 in Vehicle's leftward direction L, the lean actuator 162 causes the leaning vehicle body 12, the two steerable front wheels 14F and the one rear wheel 14R to lean in Vehicle's leftward direction L. When the turn operation inputted to the turn operation input device 18 is an operation to turn the leaning vehicle 10 to Vehicle's rightward direction R, the lean actuator 162 causes the leaning vehicle body 12, the two steerable front wheels 14F and the one rear wheel 14R to lean in Vehicle's rightward direction R.

With reference to FIG. 1, the steering mechanism 22 will be described. The steering mechanism 22 applies torque to the two steerable front wheels 14F to swivel them around the axis CL1. Thereby, the two steerable front wheels 14F swivel around the axis CL1. The application of torque to the two steerable front wheels 14F by the steering mechanism 22 is performed in accordance with the turn operation inputted to the turn operation input device 18.

With reference to FIG. 2, the steering mechanism 22 will be described. The steering mechanism 22 includes a steering actuator 221, a steering shaft 222, and a tie rod 223.

The steering actuator 221 causes the steering shaft 222 to rotate in accordance with the turn operation inputted to the turn operation input device 18. The steering actuator 221, for example, rotates an output member mechanically connected to the steering shaft 222. The steering actuator 221 is, for example, an electric motor that can rotate an output member, which is mechanically connected to the steering shaft 222, forward and in reverse. The output member is, for example, an output shaft connected to the rotor of the electric motor. For example, torque control to adjust the output torque of the steering actuator 221 is carried out to control the steering actuator 221.

The steering shaft 222 is inserted in the head pipe 1211 of the vehicle body frame 121. The steering shaft 222 is rotatable relative to the head pipe 1211. The steering shaft 222 is not mechanically connected to the handlebar 181. Accordingly, the rider's manipulation of the handlebar 181 is never transmitted to the steering shaft 222 mechanically.

The tie rod 223 transmits rotation of the steering shaft 222 to the two steerable front wheels 14F. The center part of the tie rod 223 is mechanically connected to the lower end part of the steering shaft 222. The left end part of the tie rod 223 is mechanically connected to the left suspension 163L. The right end part of the tie rod 223 is mechanically connected to the right suspension 163R.

When the steering shaft 222 rotates, the tie rod 223 moves in the direction in which the steering shaft 222 rotates, while maintaining its posture. In the meantime, the motion of the left end part of the tie rod 222 is transmitted to the steerable left front wheel 14FL via the left suspension 163L. This causes the steerable left front wheel 14FL to swivel around the steering axis CL1. In the same manner, the motion of the right end part of the tie rod 222 is transmitted to the steerable right front wheel 14FR via the right suspension 163R. This causes the steerable right front wheel 14FR to swivel around the steering axis CL1.

The steering mechanism 22 applies torque to the two steerable front wheels 14F to swivel them around the axis CL1 in accordance with the turn operation inputted to the turn operation input device 18, and thereby the two steerable front wheels 14F swivel around the axis CL1.

Specifically, when the turn operation inputted to the turn operation input device 18 is an operation to turn the leaning vehicle 10 in Vehicle's leftward direction L, the steering shaft 222 is rotated in one direction (which is referred to as a third direction) by the steering actuator 221. In this regard, the tie rod 223 transmits the rotation of the steering shaft 222 to the two steerable front wheels 14F. As a result, the two steerable front wheels 14F swivel around the axis CL1. The rotation of the two steerable front wheels 14F in the third direction causes the leaning vehicle 10 to turn in Vehicle's leftward direction L.

Also, when the turn operation inputted to the turn operation input device 18 is an operation to turn the leaning vehicle 10 in Vehicle's rightward direction R, the steering actuator 221 rotates the steering shaft 222 in another direction (which is an opposite direction to the third direction and referred to as a fourth direction). At the time, the tie rod 223 transmits the rotation of the steering shaft 222 to the two steerable front wheels 14F. As a result, the two steerable front wheels 14F swivel around the axis CL1. The rotation of the two steerable front wheels 14F in the fourth direction causes the leaning vehicle 10 to turn in Vehicle's rightward direction R.

The front-back direction acceleration detector 26 shown in FIG. 1 detects an acceleration in Vehicle's up-down direction UD or Vehicle body's up-down direction ud (which will hereinafter be referred to as an up-down direction acceleration). Specifically, the up-down direction acceleration detector 26 detects an up-down direction acceleration of a member to which the front-back direction acceleration detector 26 is attached. The up-down direction acceleration detector 26 is attached to the leaning vehicle body 12 or the suspension mechanism 16 so as to detect an up-down direction acceleration caused as only one of the steerable front wheels 14F (that is, only the steerable left front wheel 14FL or the steerable right front wheel 14FR) passes over a bump or pothole in the road. The up-down direction acceleration detector 26 may be implemented by, for example, a common acceleration sensor or an inertial measurement unit (IMU). The up-down direction acceleration sensor 26 sends the detected up-down direction acceleration to the controller 30.

The controller 30, which functions as a steering controller, controls the steering mechanism 22. The controller 30 carries out control based on the up-down direction acceleration detected by the up-down direction acceleration detector 26 in such a manner that the two steerable front wheels 14F will be in a free-steering state, so able to swivel around the steering axis CL1 freely.

The controller 30 is, for example, an ECU (electric control unit). The ECU is implemented by, for example, a combination of an IC (integrated circuit), an electronic component, a circuit board, etc.

The controller 30 includes a turn instruction value acquisition device 31, a steering mechanism controller 32, an up-down direction acceleration determiner 33, and a lean actuator controller 34. The turn instruction value acquisition device 31, the steering mechanism controller 32, the up-down direction acceleration determiner 33, and the lean actuator controller 34 are implemented, for example, when a CPU (central processing unit) reads a program stored in non-volatile memory and carries out specified processing within the program.

The turn instruction value acquisition device 31 acquires a turn instruction value based on the direction and degree of the manipulation action applied to the handlebar 181 sent from the turn operation detector 182 of the turn operation input device 18. The turn instruction value indicates the details of the turn operation inputted by the rider. The turn instruction value is used to control the lean actuator 201 and the steering actuator 221 to initiate and complete a turn of the leaning vehicle 10. The turn instruction value may include different kinds of instruction values. The turn instruction value includes a lean instruction value that instructs a leaning condition of the leaning vehicle body 12 during a turn of the leaning vehicle 10, and a steering instruction value that instructs a rotation direction and a rotation value during a turn of the leaning vehicle 10. The turn instruction value acquisition device 31 includes a lean instruction value acquisition section 311 and a steering instruction value acquisition section 312.

The lean instruction value acquisition section 311 acquires a lean instruction value that indicates a leaning condition of the leaning vehicle body 12 during a turn of the leaning vehicle 10, based on the direction and degree of the manipulation action applied to the handlebar 181. The lean instruction value is an instruction value to control the leaning actuator 201 during a turn of the leaning vehicle 10. The lean instruction value indicates, for example, a lean angle of the leaning vehicle body 12 during a turn of the leaning vehicle 10. The lean instruction value acquisition section 311 may acquire the lean instruction value, for example, by selecting and acquiring a lean instruction value from a reference table stored in memory (not shown), depending on the direction and degree of the manipulation action applied to the handlebar 181.

The steering instruction value acquisition section 312 acquires a steering instruction value that indicates a rotation direction and a rotation value during a turn of the leaning vehicle 10, based on the direction and degree of the manipulation action applied to the handlebar 181. The steering instruction value is an instruction value to control the steering actuator 221 during a turn of the leaning vehicle 10. The steering instruction value includes, for example, a torque instruction value that indicates an output torque to be outputted from the steering actuator 221. The steering instruction value acquisition section 312 may acquire the steering instruction value, for example, by selecting and acquiring a steering instruction value from a reference table stored in memory (not shown), depending on the direction and degree of the manipulation action applied to the handlebar 181.

The steering mechanism controller 32 controls the steering mechanism 22. The steering mechanism controller 32 includes a steering actuator controller 321. The steering actuator controller 321 controls the steering actuator 221 based on the steering instruction value. The steering actuator controller 321 includes a steerable front wheel freeing section 3211. When the up-down direction acceleration determiner 33 determines that the absolute value of the up-down direction acceleration detected by the up-down direction acceleration detector 26 is equal to or greater than a predetermined reference absolute value, the steerable front wheel freeing section 3211 carries out zero-torque control of the steering actuator 221 in such a manner that the two steerable front wheels 14F are in a free-steering state, so able to swivel around the steering axis CL1 freely.

The up-down direction acceleration determiner 33 determines whether the up-down direction acceleration detector 26 has detected an up-down direction acceleration. This determination is made based on whether there is an input of an up-down direction acceleration from the up-down direction acceleration detector 26 to the up-down direction acceleration determiner 33.

The up-down acceleration determiner 33 determines whether the absolute value of the up-down direction acceleration detected by the up-down direction acceleration detector 26 is equal to or greater than the predetermined reference absolute value. The predetermined reference absolute value is a reference that is used to determine whether or not to set the two steerable front wheels 14F to a free-steering state, so able to swivel around the steering axis CL1 freely. The reference absolute value is, for example, stored in memory (not shown).

The lean actuator controller 34 controls the lean actuator 162 based on the lean instruction value acquired by the lean instruction value acquisition section 311.

Figure 3:
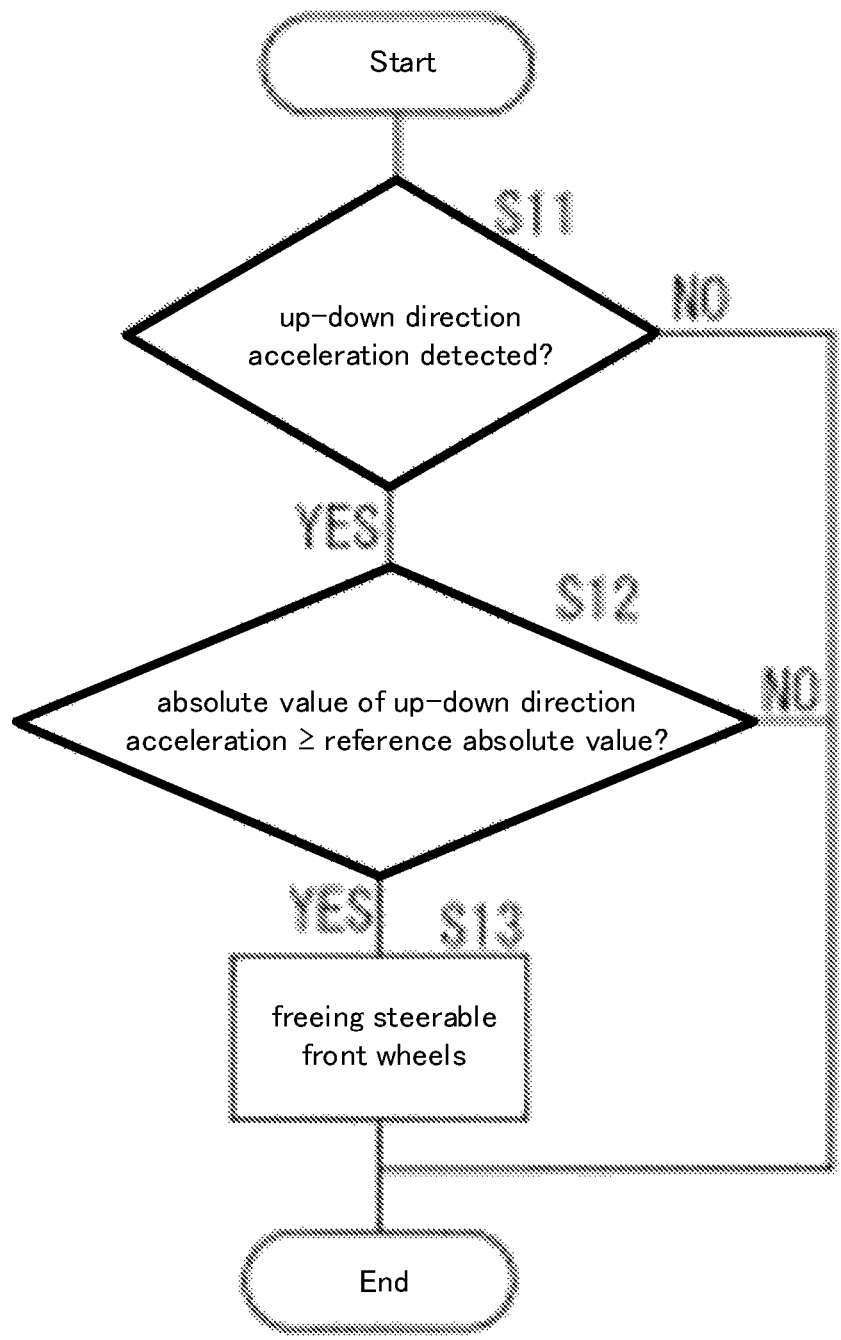
FIG. 3 is a flowchart showing a steerable front wheel freeing control procedure carried out by the controller contained in the leaning vehicle according to the embodiment of the present teaching.

Next, with reference to FIG. 3, a steerable front wheel freeing control procedure carried out by the controller 30 will be described. FIG. 3 is a flowchart showing the steerable front wheel freeing control procedure carried out by the controller 30.

First, at step S11, the controller 30 determines whether the up-down direction detector 26 has detected an up-down direction acceleration. Specifically, it is determined whether there is an input of an up-down direction acceleration from the up-down direction acceleration detector 26 to the up-down direction acceleration determiner 33.

When there is no input of an up-down direction acceleration (NO at step S11), the controller 30 terminates the steerable front wheel freeing control procedure.

When there is an input of an up-down direction acceleration (YES at step S11), at step S12, the controller 30 determines whether the absolute value of the inputted up-down direction acceleration is equal to or greater than the predetermined reference absolute value. Specifically, the up-down direction acceleration determiner 33 determines whether the absolute value of the inputted up-down direction acceleration is equal to or greater than the predetermined reference absolute value.

When the absolute value of the inputted up-down direction acceleration is smaller than the predetermined reference absolute value (NO at step S12), the controller 30 terminates the steerable front wheel freeing control procedure.

When the absolute value of the inputted up-down direction acceleration is equal to or greater than the predetermined reference absolute value (YES at step S12), at step S13, the controller 30 sets the two steerable front wheels 14F to a free-steering state, so able to swivel around the steering axis CL1 freely. Specifically, the steerable front wheel freeing section 3211 carries out zero-torque control of the steering actuator 221 in such a manner that the two steerable front wheels 14F are in a free-steering state, so able to swivel around the steering axis CL1 freely. Then, the control section 30 completes the steerable front wheel freeing control procedure.

Thus, the leaning vehicle 10 can detect an up-down direction acceleration generated as only one of the two steerable front wheels 14F passes over a bump or pothole in the road. Accordingly, the leaning vehicle 10 can distinguish momentary leaning of the leaning vehicle body 12 to the right or left of the leaning vehicle 10 caused by a disturbance, such as when only one of the two steerable front wheels 14F passes over a bump or pothole in the road, from leaning of the leaning vehicle body 12 to the right or left of the leaning vehicle 10 due to an operation inputted by the rider of the leaning vehicle 10. Thus, the leaning vehicle 10 can easily detect a disturbance that will cause the leaning vehicle body 12 to lean to the right or left of the leaning vehicle 10 momentarily, for example, when only one of the two steerable front wheels 14F passes over a bump or pothole in the road.

In the leaning vehicle 10, when a disturbance that will cause momentary leaning of the leaning vehicle body 12 to the right or left of the leaning vehicle 10, for example, when only one of the two steerable front wheels 14F passes over a bump or pothole in the road is detected, the two steerable front wheels 14F are set to a free-steering state, so able to swivel around the steering axis CL1 freely, depending on the measurement of the up-down acceleration used for the detection of the occurrence of a disturbance.

(Modification 1)

Figure 4:
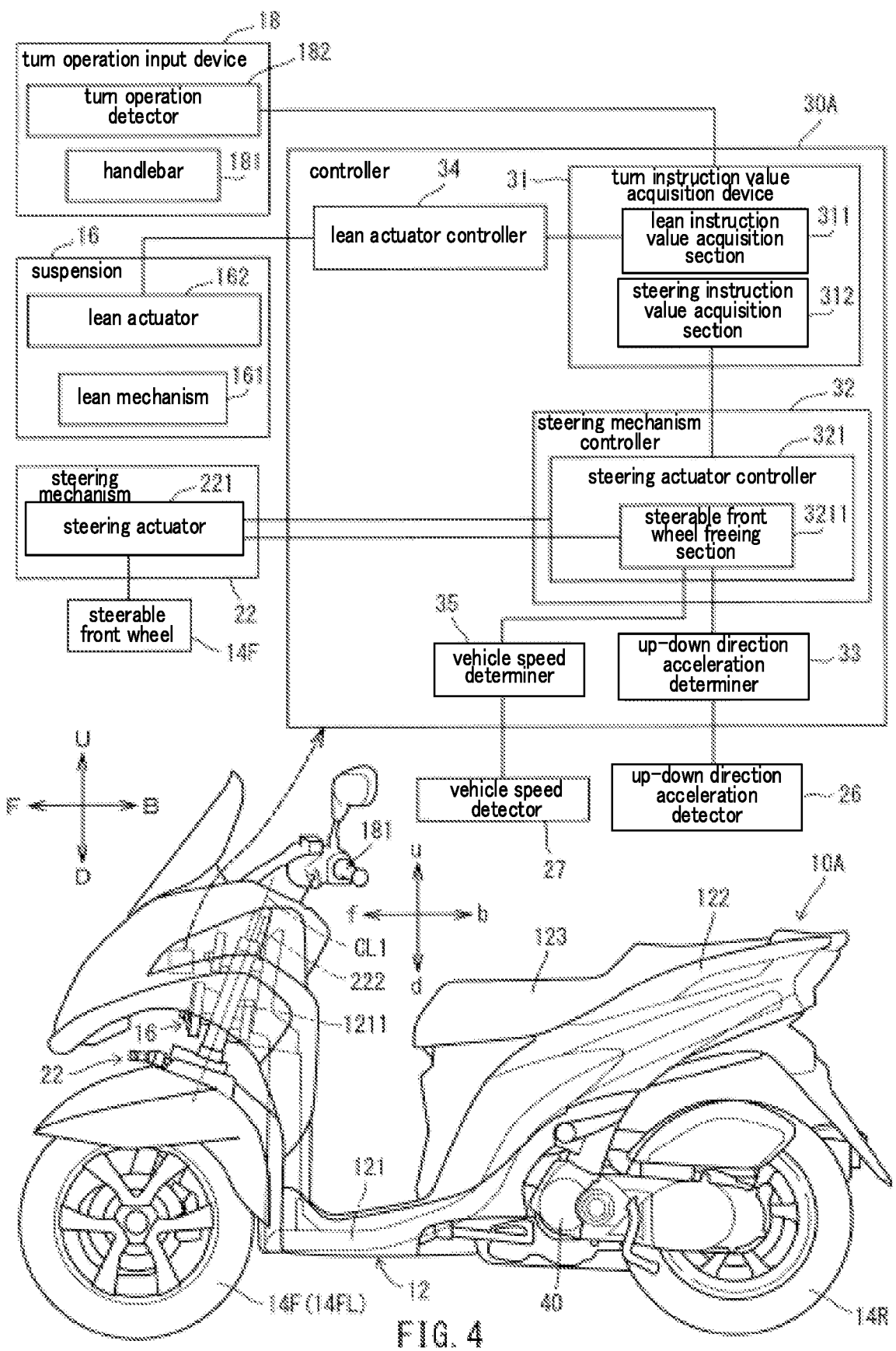
FIG. 4 is a diagram showing a left side view of a leaning vehicle according to Modification 1 of the embodiment along with a block diagram of a controller contained in the leaning vehicle.

With reference to FIG. 4, a leaning vehicle 10A according to Modification 1 of the embodiment of the present teaching will hereinafter be described. FIG. 4 is a diagram showing a left side view of the leaning vehicle 10A along with a block diagram of a controller 30A contained in the leaning vehicle 10A.

As compared with the leaning vehicle 10, the leaning vehicle 10A further includes a vehicle speed detector 27. As compared with leaning vehicle 10, also the leaning vehicle 10A includes a controller 30A instead of the controller 30.

The vehicle speed detector 27 detects a vehicle speed that is the traveling speed of the leaning vehicle 10A. The vehicle speed detector 27 sends a vehicle speed signal indicating the detected speed of the leaning vehicle 10A to the controller 30A.

As compared with the controller 30, the controller 30A further includes a vehicle speed determiner 35. The vehicle speed determiner 35 determines whether the vehicle speed of the leaning vehicle 10A is equal to or greater than a predetermined reference speed. The predetermined reference speed is a reference that is used to determine whether or not to set the two steerable front wheels 14F to a free-steering state, so able to swivel around the steering axis CL1 freely. The predetermined reference speed is, for example, stored in memory (not shown).

Figure 5:
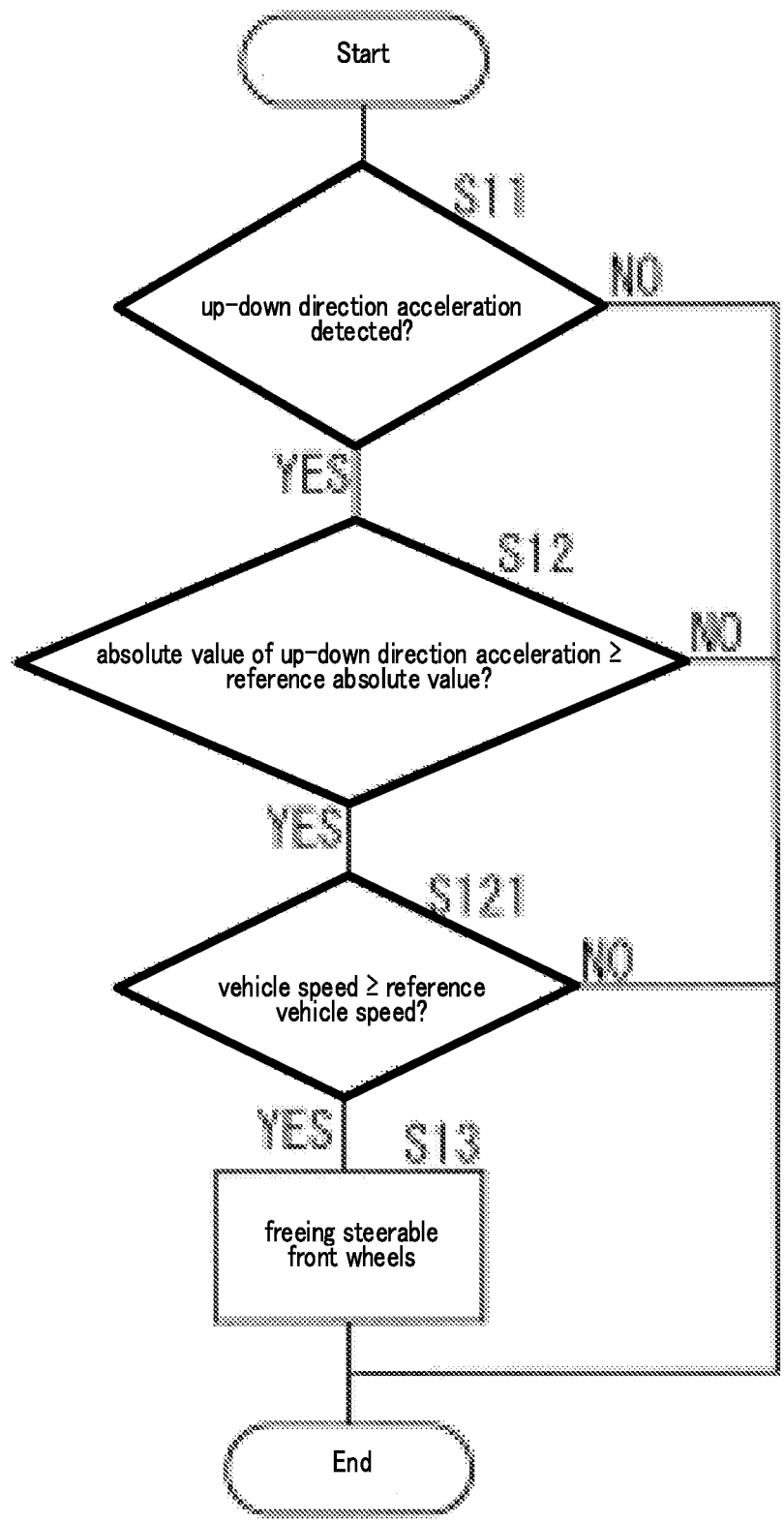
FIG. 5 is a flowchart showing a steerable front wheel freeing control procedure carried out by the controller contained in the leaning vehicle according to Modification 1 of the embodiment.

Next, with reference to FIG. 5, a steerable front wheel freeing control procedure carried out by the controller 30A will be described. FIG. 5 is a flowchart showing the steerable front wheel freeing control procedure carried out by the controller 30A.

As compared with the steerable front wheel freeing control procedure carried out by the controller 30, the steerable front wheel freeing control procedure carried out by the controller 30A includes an additional processing step S121 between step S12 and step S13. At step S121, the controller 30A determines whether the speed of the leaning vehicle 10A is equal to or greater than the predetermined reference speed. Specifically, the vehicle speed determiner 35 determines whether the speed of the leaning vehicle 10A detected by the vehicle speed detector 27 is equal to or greater than the predetermined reference speed.

When the speed of the leaning vehicle 10A is equal to or greater than the predetermined reference speed (YES at step S12), the controller 30A carries out the processing at and after step S13. When the speed of the leaning vehicle 10A is smaller than the predetermined reference speed (YES at step S12), the controller 30A terminates the steerable front wheel freeing control procedure.

When the leaning vehicle 10A is traveling at a speed greater than the predetermined reference speed, the two steerable front wheels 14F can be set to a free-steering state, so able to swivel around the steering axis CL1 freely.

(Modification 2)

Figure 6:
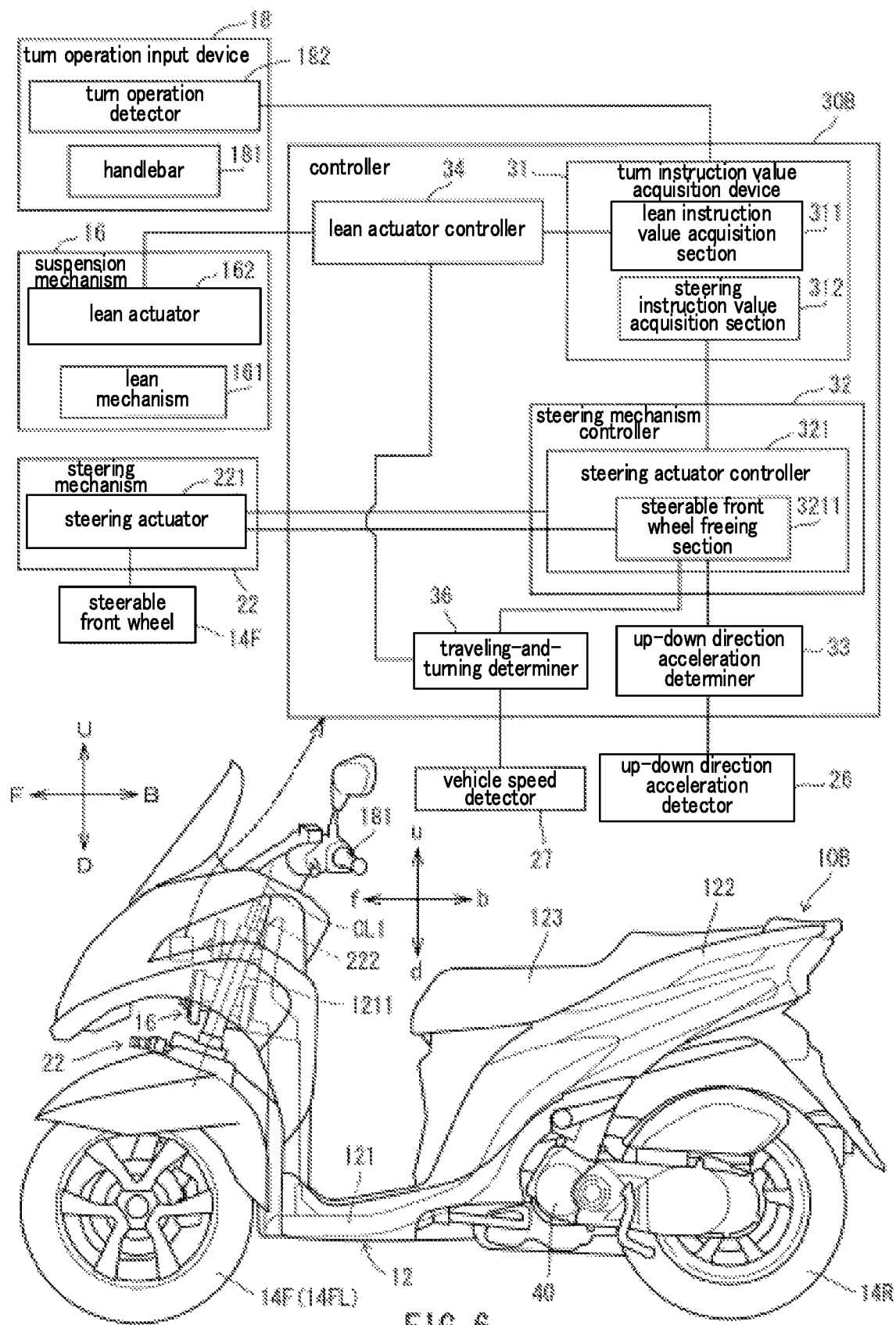
FIG. 6 is a diagram showing a left side view of a leaning vehicle according to Modification 2 of the embodiment along with a block diagram of a controller contained in the leaning vehicle.

With reference to FIG. 6, a leaning vehicle 10B according to Modification 2 of the embodiment of the present teaching will hereinafter be described. FIG. 6 is a diagram showing a left side view of the leaning vehicle 10B along with a block diagram of a controller 30B contained in the leaning vehicle 10B.

As compared with the leaning vehicle 10, the leaning vehicle 10B further includes a vehicle speed detector 27. The vehicle speed detector 27 of the leaning vehicle 10B is the same as that of the leaning vehicle 10A, and a detailed description thereof is omitted.

As compared with the leaning vehicle 10, the leaning vehicle 10B includes a controller 30B instead of the controller 30. As compared with the controller 30, the controller 30B further includes a traveling-and-turning determiner 36.

The traveling-and-turning determiner 36 determines whether the leaning vehicle 10A is traveling into a turn. Specifically, the traveling-and-turning determiner 36 determines whether the traveling-and-turning determiner 36 is receiving both a control signal indicating that the lean actuator controller 34 is controlling the lean actuator 163 and a vehicle speed signal indicating the speed of the leaning vehicle 10B detected by the vehicle speed detector 27.

While the leaning vehicle 10B is in a traveling-and-turning state, the controller 30B carries out control to set the two steerable front wheels 14F to a free-steering state, so able to swivel around the steering axis CL1 freely, based on the up-down direction acceleration detected by the up-down direction acceleration detector 26.

Figure 7:
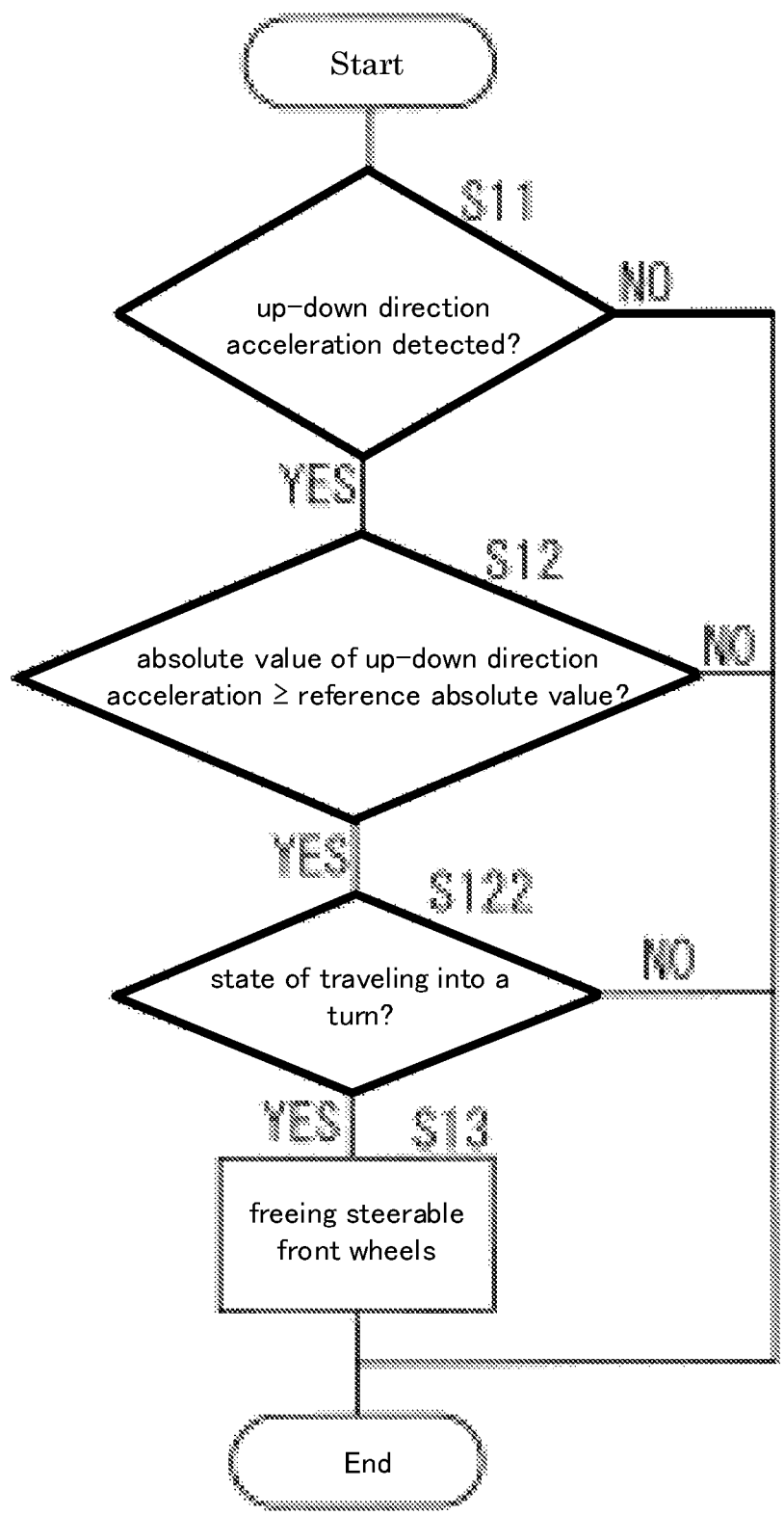
FIG. 7 is a flowchart showing a steerable front wheel freeing control procedure carried out by the controller provided in the leaning vehicle according to Modification 2 of the embodiment.

Next, with reference to FIG. 7, a steerable front wheel freeing control procedure carried out by the controller 30B will be described. FIG. 7 is a flowchart showing the steerable front wheel freeing control procedure carried out by the controller 30B.

As compared with the steerable front wheel freeing control procedure carried out by the controller 30, the steerable front wheel freeing control procedure carried out by the controller 30B includes an additional processing step S122 between step S12 and step S13. At step S122, the controller 30B determines whether the leaning vehicle 10B is in a state of traveling into a turn.

Specifically, when the traveling-and-turning determiner 36 is receiving both a control signal indicating that the lean actuator controller 34 is controlling the lean actuator 163 and a vehicle speed signal indicating the speed of the leaning vehicle 10B detected by the vehicle speed detector 27, the traveling-and-turning determiner 36 determines that the leaning vehicle 10B is in a state of traveling into a turn. In any case of (1), (2) or (3) below, however, the traveling-and-turning determiner 36 determines that the leaning vehicle 10B is not in a state of traveling into a turn.

(1) When the traveling-and-turning determiner 36 is not receiving a control signal indicating that the lean actuator controller 34 is controlling the lean actuator 163 but is receiving a vehicle speed signal indicating the speed of the leaning vehicle 10B detected by the vehicle speed detector 27, the traveling-and-turning determiner 36 determines that the leaning vehicle 10B is not in a state of traveling into a turn.

(2) When the traveling-and-turning determiner 36 is receiving a control signal indicating that the lean actuator controller 34 is controlling the lean actuator 163 but is not receiving a vehicle speed signal indicating the speed of the leaning vehicle 10B detected by the vehicle speed detector 27, the traveling-and-turning determiner 36 determines that the leaning vehicle 10B is not in a state of traveling into a turn.

(3) When the traveling-and-turning determiner 36 is not receiving a control signal indicating that the lean actuator controller 34 is controlling the lean actuator 163 and is not receiving a vehicle speed signal indicating the speed of the leaning vehicle 10B detected by the vehicle speed detector 27, the traveling-and-turning determiner 36 determines that the leaning vehicle 10B is not in a state of traveling into a turn.

When the leaning vehicle 10B is in a state of traveling into a turn (YES at step S122), the controller 30B carries out processing at and after step S13. When the leaning vehicle 10B is not in a state of traveling into a turn (NO at step S122), the controller 30B terminates the steerable front wheel freeing control procedure.

While the leaning vehicle 10B is traveling into a turn, when one of the two steerable front wheels 14F passes over a bump or pothole in the road, the leaning vehicle 10B can set the two steerable wheels 14F to a free-steering state, so able to swivel around the steering axis CL1 freely. Thus, even while the leaning vehicle body 12 of the leaning vehicle 10B is leaning, when one of the two steerable front wheels 14F passes over a bump or pothole in the road, the leaning vehicle 10B can set the two steerable wheels 14F to a free-steering state, so able to swivel around the steering axis CL1 freely.

(Modification 3)

Figure 8:
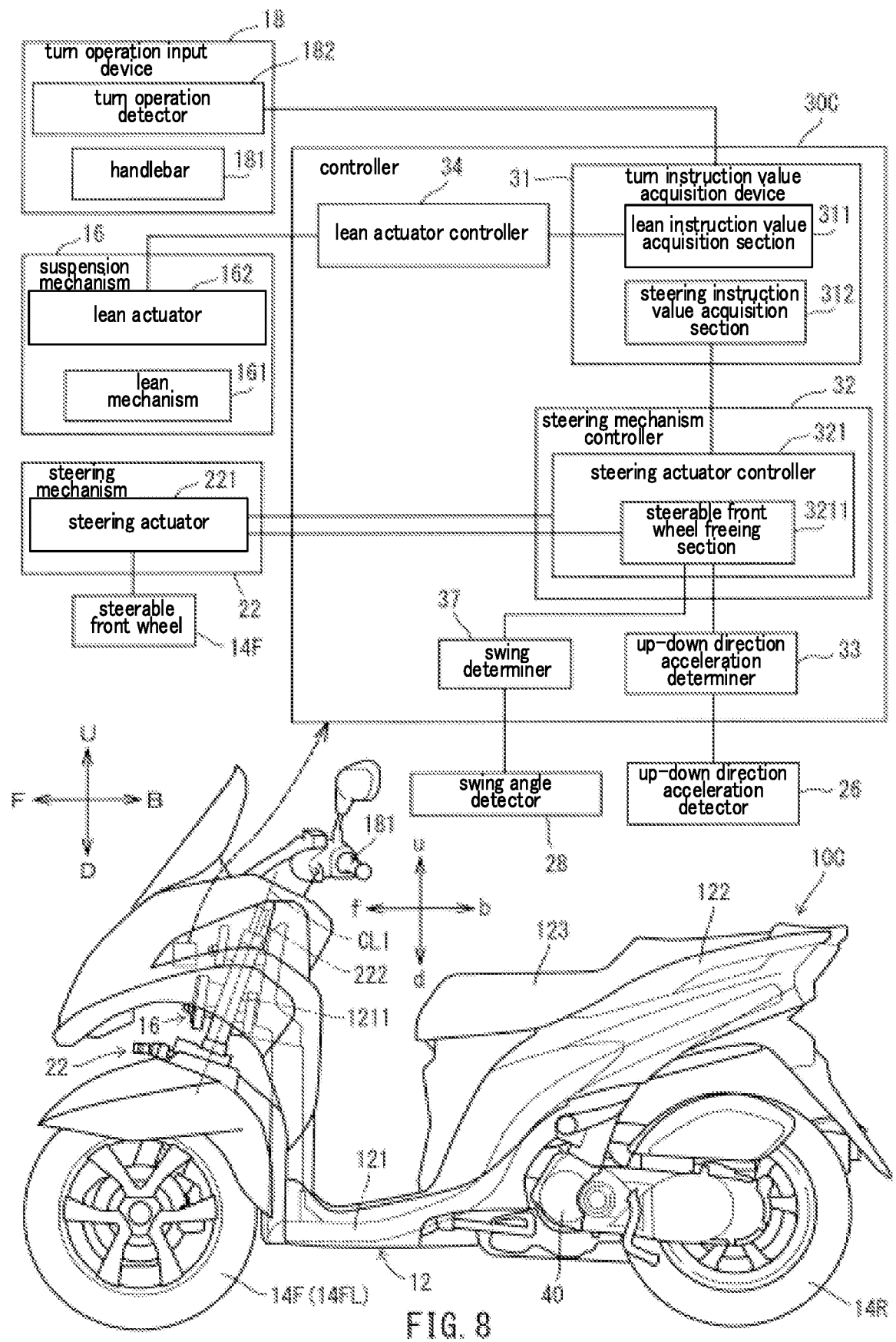
FIG. 8 is a diagram showing a left side view of a leaning vehicle according to Modification 3 of the embodiment along with a block diagram of a controller contained in the leaning vehicle.

With reference to FIG. 8, a leaning vehicle 10C according to Modification 3 of the embodiment of the present teaching will hereinafter be described. FIG. 8 is a diagram showing a left side view of the leaning vehicle 10C along with a block diagram of a controller 30C contained in the leaning vehicle 10C.

As compared with the leaning vehicle 10, the leaning vehicle 10C further includes a swing angle detector 28. The swing angle detector 28 detects the swing angle of the upper arm 1611, which is a swingable member included in the leaning mechanism 161 of the suspension mechanism 16. The swing angle detector 28 sends the detected swing angle of the upper arm 1611 to the controller 30C. The swing angle detector 28 may detect the swing angle of the lower arm 1612, which is a swingable member included in the leaning mechanism 161 of the suspension mechanism 16, and may send the detected swing angle of the lower arm 1612 to the controller 30C.

As compared with the leaning vehicle 10, the leaning vehicle 10C includes a controller 30C instead of the controller 30. As compared with the controller 30, the controller 30C further includes a swing determiner 37. The swing determiner 37 determines whether the swing angle of the upper arm 1611 is equal to or greater than a predetermined reference angle. The predetermined reference angle is a reference that is used to determine whether or not to set the two steerable front wheels 14F to a free-steering state, so able to swivel around the steering axis CL1 freely. The predetermined reference angle is, for example, stored in a memory (not shown).

The controller 30B carries out control to set the two steerable front wheels 14F to a free-steering state, so able to swivel around the steering axis CL1 freely, based on the up-down direction acceleration detected by the up-down direction acceleration detector 26 and the swing angle of the upper arm 1611 detected by the swing angle detector 28.

Figure 9:
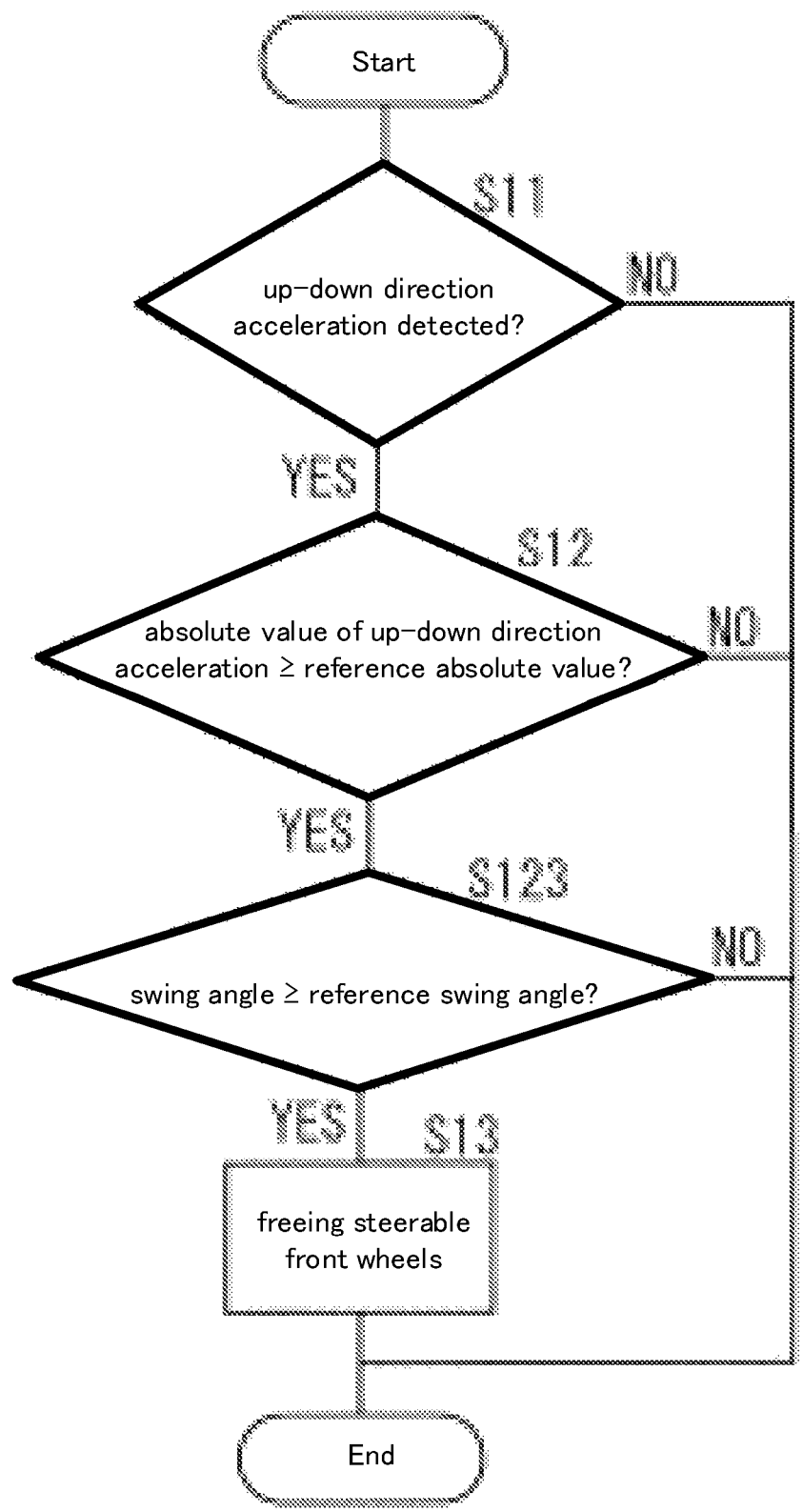
FIG. 9 is a flowchart showing a steerable front wheel freeing control procedure carried out by the controller contained in the leaning vehicle according to Modification 3 of the embodiment.

Next, with reference to FIG. 9, a steerable front wheel freeing control procedure carried out by the controller 30C will be described. FIG. 9 is a flowchart showing the steerable front wheel freeing control procedure carried out by the controller 30C.

As compared with the steerable front wheel freeing control procedure carried out by the controller 30, the steerable front wheel freeing control procedure carried out by the controller 30C includes an additional processing step S123 between step S12 and step S13. At step S123, the controller 30C determines whether the swing angle of the upper arm 1611 is equal to or greater than the predetermined reference angle. Specifically, the swing angle determiner 37 determines whether the swing angle of the upper arm 1611 is equal to or greater than the predetermined reference angle.

When the swing angle of the upper arm 1611 is equal to or greater than the predetermined reference angle (YES at step S123), the controller 30C carries out processing at and after step S13. When the swing angle of the upper arm 1611 is smaller than the predetermined reference angle (YES at step S123), the controller 30C terminates the steerable front wheel freeing control procedure.

In the leaning vehicle 10C, when the swing angle of the upper arm 1611 is equal to or greater than the predetermined reference angle, the two steerable front wheels 14F can be set to a free-steering state, so able to swivel around the steering shaft CL1 freely. Thus, the controller 30C can grasp the situation more appropriately for more appropriate control as to whether to set the two steerable front wheels 14F to a free-steering state, so able to swivel around the steering axis CL1 freely.

Other Embodiments

The embodiments and modifications described herein and/or illustrated by the drawings are to make the present teaching easier to understand and not to limit the concept of the present teaching. It is possible to adapt or alter the embodiments and modifications described above without departing from the gist thereof.

The gist includes all equivalent elements, modifications, omissions, combinations (for example, combinations of features of the embodiments and modifications), adaptations and alterations as would be appreciated by those in the art based on the embodiments and modifications disclosed herein. The limitations in the claims are to be interpreted broadly based on the language employed in the claims and not limited to the embodiments described in the present specification or during the prosecution of the present application. Such embodiments and modifications are to be understood as non-exclusive. For example, the terms "preferable" and "good" in the present specification are to be understood as non-exclusive, and these terms mean "preferable but not limited to this" and "good but not limited to this", respectively.

In the above-described embodiment, the leaning vehicle 10 is a three-wheeled vehicle with two steerable front wheels 14F and one rear wheel 14R. However, the leaning vehicle 10 may be, for example, a three-wheeled vehicle with one steerable front wheel 14F and two rear wheels 14R or a four-wheeled vehicle with two steerable front wheels 14F and two rear wheels 14R.

In the above-described embodiment, the manipulable member that can be manipulated by the rider is implemented by the handlebar 181. However, the manipulable member may be, for example, a steering wheel, a jog dial, a touch panel, a press-button device, or the like.

In the above-described embodiment, the lean actuator 162 may include, for example, a rack-and-pinion.

In the above-described embodiment, the steering actuator 221 may include, for example, a rack-and-pinion.

In the above-described embodiment, the lean mechanism 161 is a parallelogram link type. However, the leaning mechanism 161 may be a double wishbone type.

In Modification 2 of the embodiment above, for example, when the leaning vehicle 10B includes a lean angle detector that detects the lean of the leaning body in Vehicle's leftward direction L or Vehicle's rightward direction R, the leaning-and-turning determiner 36 may detect whether the leaning vehicle 10B is turning or not, based on the lean angle detected by the lean angle detector.

REFERENCE SIGNS LIST

10 leaning vehicle
12 leaning vehicle body
121 vehicle body frame
1211 head pipe
122 vehicle body cover
123 seat
14 wheel
14F steerable front wheel
14FL steerable left front wheel
14FR steerable right front wheel
14R rear wheel
16 suspension mechanism
161 lean mechanism
1611 upper arm
1612 lower arm
1613 left member
1614 right member
162 lean actuator
163L left suspension
163R right suspension
22 steering mechanism
221 steering actuator
222 steering shaft
223 tie rod
26 up-down direction acceleration detector
27 vehicle speed detector
30 controller
32 steering mechanism controller
321 steering actuator controller
3211 steerable front wheel freeing section
33 up-down direction acceleration determiner
35 vehicle speed determiner
36 traveling-and-turning determiner

The invention claimed is:

1. A leaning vehicle, comprising:
a vehicle body that
leans in a leftward direction of the leaning vehicle when the leaning vehicle is turning left, and
leans in a rightward direction of the leaning vehicle when the leaning vehicle is turning right;
a plurality of wheels supported by the vehicle body, and including
one steerable front wheel and two rear wheels, the one steerable front wheel being swivelable around a first steering axis extending in an up-down direction of the vehicle body, or
two steerable front wheels and one or two rear wheels, the two steerable front wheels being swivelable around a second steering axis extending in the up-down direction of the vehicle body,
the two steerable front wheels or the two rear wheels being arranged side by side in a left-right direction of the leaning vehicle, to form a left-right pair of wheels;
a suspension mechanism that supports the left-right pair of wheels in such a manner that the left-right pair of wheels is movable in the up-down direction of the vehicle body relative to the vehicle body;
a steering mechanism that applies torque to the one or two steerable front wheels to swivel the one or two steerable front wheels around the first or second steering axis;
a steering controller that controls the steering mechanism; and
an up-down direction acceleration detector attached to the vehicle body or the suspension mechanism, to detect an acceleration in an up-down direction of the leaning vehicle or the up-down direction of the vehicle body, that is generated as one wheel in the left-right pair of wheels moves over a bump or a pothole in a road, wherein
the steering controller so controls the one or two steerable front wheels that the one or two steerable front wheels are in a free-steering state, so as to swivel around the first or second steering axis freely, based on the acceleration detected by the up-down direction acceleration detector.

2. The leaning vehicle according to claim 1, wherein the steering controller so controls the one or two steerable front wheels as the leaning vehicle is traveling into a turn.

3. The leaning vehicle according to claim 1, further comprising a vehicle speed detector that detects a speed of the leaning vehicle and sends the detected speed to the steering controller,
wherein the steering controller controls the one or two steerable front wheels based further on the speed detected by the vehicle speed detector.

4. The leaning vehicle according to claim 1, wherein:
the suspension mechanism includes a swingable member that swings in the up-down direction of the vehicle body when the left-right pair of wheels moves in the up-down direction of the vehicle body relative to the vehicle body;
the leaning vehicle further comprises a swing angle detector that detects a swing angle of the swingable member and sends the detected swing angle to the steering controller; and
the steering controller controls the one or two steerable front wheels based further on the swing angle detected by the swing angle detector.

5. The leaning vehicle according to claim 1, wherein:
the steering mechanism includes a steering actuator that applies torque to the one or two steerable front wheels to swivel the one or two steerable front wheels around the first or second steering axis; and
the steering controller controls the one or two steerable front wheels by (1), (2) or (3) below:
(1) carrying out zero-torque control of the steering actuator;
(2) supplying zero electric current to the steering actuator; or
(3) providing a clutch, and blocking torque transmission from the steering actuator to the one or two steerable front wheels by the clutch.

6. The leaning vehicle according to claim 1, wherein:
the vehicle body supports the plurality of wheels and leans together with the plurality of wheels.

7. The leaning vehicle according to claim 1, further comprising a turn operation input device, wherein:
responsive to an operation received from the turn operation input device, the vehicle body leans as the one or two steerable front wheels swivel.

8. The leaning vehicle according to claim 1, wherein:
the steering controller controls the one or two steerable front wheels, to thereby distinguish momentary leaning of the vehicle body caused by a disturbance as the one wheel in the left-right pair of wheels moves over the bump or the pothole in the road, from leaning of the vehicle body due to an operation inputted by a rider of the leaning vehicle.

9. The leaning vehicle according to claim 1, wherein:
the steering controller detects an occurrence of a disturbance that is to cause momentary leaning of the vehicle body in the leftward direction or the rightward direction as the one wheel in the left-right pair of wheels moves over the bump or the pothole in the road, and controls the one or two steerable front wheels depending on an extent of the acceleration detected as the disturbance.

* * * * *